Aug. 11, 1936.  R. K. HOPKINS  2,050,326
METHOD OF WELDING
Filed Feb. 14, 1936
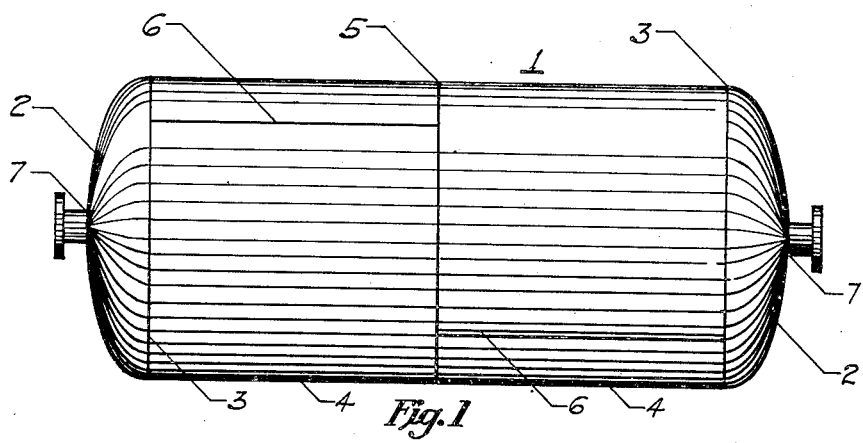
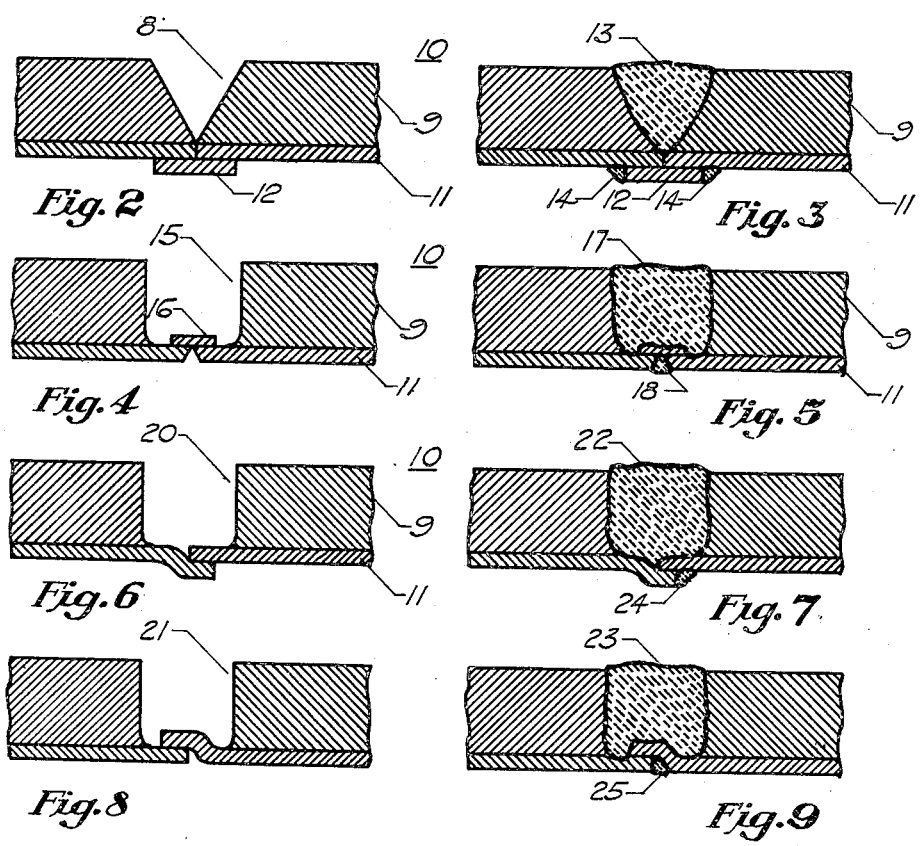
INVENTOR
Robert K. Hopkins
BY Virgil F. Davies
ATTORNEY Patented Aug. 11, 1936

2,050,326

UNITED STATES PATENT OFFICE 2,050,326

METHOD OF WELDING

Robert K. Hopkins, New York, N. Y., assignor to The M. W. Kellogg Co., New York, N. Y., a corporation of Delaware Application February 14, 1936, Serial No. 63,843

6 Claims. (Cl. 219—10)

This invention relates in general to welding and in particular to the welding of seams in articles made up of alloy clad steel plate.

Alloy clad steel plate, made up of thick carbon steel base metal to which is intimately bonded a thin layer of alloy steel of superior corrosion resisting properties, is excellent material for the fabrication of vessels for the oil refinery and chemical industries. Because of the severe conditions to which such vessels are subjected in service it is essential that the welds joining the component parts of the vessels be of the highest quality. Considerable trouble has been experienced in producing satisfactory welds in vessels made from alloy clad plate by reason of the contamination of the weld metal. Thus when the welding of the seams of alloy clad steel vessels is carried out in accordance with the present accepted practice, the main weld, i. e., the weld in the carbon steel portion of the clad plate is contaminated by the constituents of the alloy portion of the clad plate while the weld in the alloy portion is diluted with regard to alloy constituents and is contaminated by the constituents of the steel portion.

The contamination of the main weld and the effect of the contamination on the character of the weld depend on the depth of the main weld as well as on the composition of the alloy portion of the clad plate. Nickel and chromium contaminations are the most objectionable as they tend to render the main weld porous and brittle respectively. Since the main welds of the vessels of the character mentioned are ordinarily very deep, in the order of an inch or more, the contamination is generally not sufficient to render the welds unacceptable. However, when the main welds are shallow special technique must be employed in order to prevent contamination.

It is the present practice to deposit the alloy weld metal in a groove whose bottom is for the major part entirely in the steel portion of the composite plate. As the alloy portion of the clad plate is in the order of one eighth of an inch in thickness, the required weld metal is usually deposited as a single bead or course. Thus in the average case about half of the total content of alloy constituent or constituents find their way into the carbon steel base metal and at the same time enough carbon finds its way into the alloy weld metal to increase the carbon content of the alloy weld metal materially. These deleterious results are unavoidable if the welding is carried out as in the present practice and it is almost impossible to obtain deposited alloy weld metal having the same characteristics as the alloy portion of the composite plate.

It is an object of this invention to provide a simple and inexpensive method, for welding together the alloy portions of alloy clad steel plate, of such a nature that the weld metal is uncontaminated by the constituents of the steel portion of the alloy clad plate.

The further objects and advantages of the invention will become apparent from the following description of a preferred manner of carrying out the invention in practice taken with the accompanying drawing, in which, Fig. 1 is a front view of a completed pressure vessel, Figs. 2, 4, 6 and 8 are fragmentary sectional views each illustrating a manner of preparing the seams of the pressure vessel for welding, and Figs. 3, 5, 7 and 9 are fragmentary sectional views corresponding respectively to Figs. 2, 4, 6 and 8 and illustrating the seams as they appear after the welding is completed.

While I prefer to describe my invention in connection with the fabrication of pressure vessel I it is to be understood that it may be employed in connection with the welding of all types of articles made from alloy clad plate.

Pressure vessel I is intended to represent any of the vessels used in the oil refinery and chemical industries for acting upon substances, that include corrosive ingredients under drastic temperature and pressure conditions.

Pressure vessel I includes dished heads 2 that are joined by means of circumferential welds 3 to the cylindrical portion of pressure vessel I. The cylindrical portion of pressure vessel I may be made up of a single cylindrical section 4 or it may be made up of a plurality of cylindrical sections 4. Pressure vessel I, as shown, is made up of two cylindrical sections 4 joined together by means of circumferential weld 5. Each of the cylindrical sections 4 may be made up of one or more alloy clad steel plates joined together by means of longitudinal welds 6. Flange connectors 7 are provided at each end of pressure vessel I, further connectors, nozzles, manways, and the like, not shown, may be provided as required.

In fabricating pressure vessel I the alloy clad steel plate out of which cylindrical sections 4 are to be made is cut as required and its edges formed into the component parts of welding grooves, the V-shaped groove of Fig. 2 or the U-shaped grooves of Figs. 4, 6, and 8 may be used as preferred. The cut plate is then shaped as required to form the component parts of vessel 1. The vessel 1 is completed by aligning the component parts and uniting the abutting edges by welding.

To produce the joint shown in Fig. 3 the edges to be joined of the composite plate 10 are chamfered to produce the component parts of V-shaped welding groove 8. The chamfering is preferably so carried out that the component parts of welding groove 8 are entirely in the steel portion 9. After the component parts of welding groove 8 have been formed the edges to be joined are aligned, as in the usual practice, and a strip 12 of alloy material, of preferably the same composition as the alloy portion 11, is placed below the abutting edges of the alloy portion 11. Strip 12 may be held in position by mechanical means, such as by clamps (not shown), or it may be tack-welded in place. Welding groove 8 is then filled with fusing weld metal to form the weld 13. The weld metal of weld 13 may be deposited by means of an electric arc or by means of a gas torch. The weld metal of weld 13 preferably is of the same composition as the steel portion 9 of composite plate 10. After the welding of the main welds 13 is completed, welds 14 are deposited to unite strip 12 to the alloy portion 11. Welds 14 may be deposited electrically or by gas welding. The metal of welds 14 is preferably of the same composition as the alloy portion 11. The completed joint by reason of weld 13 has the required strength and by reason of strip 12 and welds 14 presents a surface which has corrosion resisting characteristics equal to those of the alloy portion 11.

To produce the joint shown in Fig. 5, the edges of the plate 10 are chamfered to form the component parts of U-shaped welding groove 15. The chamfering of the edges is so carried out that the edge of the alloy portion 11 are exposed and extend beyond the sides of groove 15. After the component parts of welding groove 15 have been formed the edges to be joined are aligned and a strip 16 of alloy material, of preferably the same composition as the alloy portion 11 is placed on top of the edges of portion 11 that form the floor of the welding groove 15. Strip 16 may be fastened in position by mechanical means or by tack-welds. When the edges to be joined have been assembled in the manner just mentioned, groove 15 is filled with fusing weld metal to form weld 17. The weld metal of weld 17 is preferably of the same composition as steel portion 9 of composite plate 10. The joint is then completed by chipping out between the unjoined abutting edges of alloy portion 11 and depositing weld metal therein to form the weld 18. The metal of weld 18 is preferably of substantially the same composition as that of the alloy portion 11 and is deposited by gas or electric welding as preferred. If desired the chipping operation may be omitted and the edges shaped during the formation of the component parts of the main welding groove 15. It is to be particularly noted that when the joint of Fig. 5 is completed the alloy face presents a continuous surface of metal of substantially the same corrosion resistant characteristics.

The joints of Figs. 7 and 9 are produced in very much the same manner as that of Fig. 5. In preparing grooves 20 of Fig. 6, one edge of alloy portion 11 is exposed for a greater distance than the other edge with which it is to finally cooperate, and the longer edge is bent as shown so that when the edges to be joined are brought into abutment, the longer edge will underlie the shorter edge. By this expedient the use of strips 12 and 16 is eliminated. In forming the groove 21 of Fig. 8, the longer edge is bent to overlie the shorter edge. Grooves 20 and 21 are filled with molten weld metal deposited either by a gas torch or by the electric arc to form welds 22 and 23. The joints of Figs. 7 and 9 are completed by depositing respectively welds 24 and 25 the weld metal of which is preferably of the same composition as alloy portion 11. Thus at the joints of Figs. 7 and 9 an alloy surface is presented of substantially uniform corrosion resistant properties.

It is to be noted that in all of the joints illustrated and described the welds 14, 18, 24, and 25 are deposited in grooves the sides of which are all of alloy material of substantially the same composition. By reason of this there is no dilution or contamination of the metal of the welds mentioned. Thus welds 14, 18, 24 and 25 are not only of predictable composition but also have corrosion resistant properties equal to that of the base metal upon which they are deposited.

While my novel method has been described in connection with the joining of the edges of composite plate, it is to be understood that my invention is not limited to a plate of this nature but can equally well be applied in the welding of plate which includes an alloy lining that may be welded to it throughout, or may be connected to it by welds or other means at spaced points, or may merely be placed on it.

I claim:

1. The method of welding articles formed from composite plate having a thick base plate of one composition and a thin plate of a different composition which comprises forming a welding groove between the edges of the composite plate to be joined by removing metal of the thick base plate, providing an added thickness of material of substantially the same composition as said thin plate adjacent the floor of the welding groove, filling the welding groove with fusing weld metal of composition similar to that of the thick base plate, and depositing fusing weld metal of composition similar to that of said thin plate to close joint in the face of said thin plate.

2. The method of welding articles formed from composite plate having a thick base plate of comparatively low corrosion resistance characteristics and a thin plate of high corrosion resistance characteristics covering said thick plate, which comprises forming a welding groove between the edges of the composite plate to be joined by removing metal of the thick plate to substantially the line separating it from the thin plate, overlapping the joint at the thin plate by a thickness of material of substantially the same composition as the thin plate, filling the welding groove with fusing weld metal of composition similar to that of the thick plate, and sealing the joint in the face of the thin plate by depositing therein fusing weld metal of substantially the same composition as the thin plate whereby the face of said thin plate at the joint presents a surface of uniformly high corrosion resistant properties.

3. The method of joining edges of composite plate having a thick base plate of comparatively low corrosion resistance covered by a thin plate of high corrosion resistance, which comprises forming a welding groove between the edges to be joined by removing metal of the thick plate to expose a portion of the thin plate at each edge, providing an extra thickness of metal of composition similar to that of said thin plate between the floor of said welding groove and at least one of said exposed portions, filling said welding groove with fusing weld metal of composition similar to that of the thick plate, and sealing the joint on the face of the thin plate by depositing therein fusing weld metal of substantially the same composition as the thin plate.

4. The method of joining edges of composite plate having a thick base plate of comparatively low corrosion resistance covered by a thin plate of high corrosion resistance, which comprises forming a welding groove between the edges to be joined by removing metal of the thick plate to expose a portion of the thin plate at each edge, one of said exposed portions being appreciably longer than the other of said exposed portions, lapping the longer of said exposed portions over the shorter of said exposed portions whereby a thickness of the thin plate is provided between the floor of said welding groove and the seam on the face of the thin plate, filling said welding groove with fusing weld metal of composition similar to that of said thick plate, and filling the seam on the face of said thin plate with fusing weld metal of composition similar to said thin plate.

5. The method of welding articles formed from composite plate having a thick carbon steel base plate and thin alloy plate of high corrosion resistance covering said thick plate, which comprises forming a welding groove between the edges to be joined by removing metal of the thick plate to expose a portion of the thin plate at each edge, one of said exposed portions being substantially longer than the other of said exposed portions, bending said longer portion and interposing it between the floor of said welding groove and said shorter portion filling said welding groove with fusing carbon steel weld metal, and depositing fusing weld metal of a composition similar to said alloy plate between said shorter portion and said longer portion.

6. The method of welding articles formed from composite plate having a thick carbon steel base plate and thin alloy plate of high corrosion resistance covering said thick plate, which comprises forming a welding groove between the edges to be joined by removing metal of the thick plate to expose a portion of the thin plate at each edge, one of said exposed portions being substantially longer than the other of said exposed portions, bending said longer portion and interposing it upon said shorter portion in the face of said thin plate, filling said welding groove with fusing carbon steel weld metal, and depositing fusing weld metal of substantially the same composition as that of said thin plate between the edge of said longer portion and the face of said thin plate to seal the joint on the face of said thin plate.

ROBERT K. HOPKINS.